Aug. 26, 1947. G. L. M. HÉRONDELLE 2,426,213
GYROSCOPE
Filed March 24, 1943

INVENTOR.
Guy L M HÉRONDELLE
BY
ATTORNEY.

Patented Aug. 26, 1947

2,426,213

UNITED STATES PATENT OFFICE 2,426,213

GYROSCOPE

Guy L. M. Hérondelle, Lyon, France, assignor to International Standard Electric Corporation, New York, N. Y., a corporation of Delaware Application March 24, 1943, Serial No. 480,411
In France January 31, 1942

4 Claims. (Cl. 74—5)

The present invention relates to gyroscopic apparatus and particularly to tacking indicators designed to be mounted on board high speed vehicles such as aeroplanes or ships.

The invention is applicable particularly to gyroscopes of the type intended to indicate any rotation of the vehicle around a vertical axis, the rectification of the gyroscope being obtained by means of an assemblage, driven and damped by air, for example.

One of the objects of the invention is to provide simple means to assure the rectification and damping of a gyroscopic tacking indicator according to the consecutive deviations caused by the tacking of the vehicle on which the gyroscope is mounted.

Another object of the invention is to provide means for making the action of the apparatus and the damping of the gyroscopic tacking indicator symmetrical, that is, to assure the same damping when the gyroscope deviates in one direction or the other.

In accordance with this invention, the damping and rectifying of a gyroscope is obtained by a construction such that the driving-damping combination is controlled from the frame of the gyroscope by means of levers, the assemblage being disposed in such a manner that the reactions are equal as the gyroscope deviates in one direction or the other. Moreover, the profile of the levers may be so designed, as to amplify the reaction of the force at the start and finish of the deviation of the frame.

These and other features and objects of the invention will be understood more fully from the following detailed description in connection with the accompanying drawings, in which.

Figure 1:
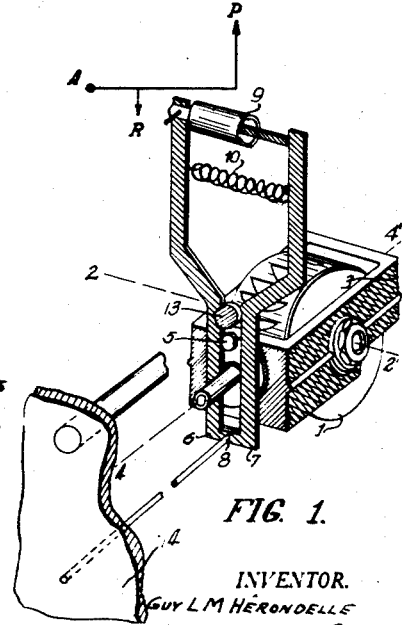
Fig. 1 is a perspective view of a gyroscope and of one form of apparatus showing certain features of the invention for restoring the gyroscope to a vertical plane.

Referring to Fig. 1, the gyroscope 1 rotates on a horizontal axis 2—2' inside the frame 3. The gyroscope may be pneumatically or electrically driven. The frame 3 is mounted in such a manner as to be rotatable on axis 4—4'. On one of its end faces it carries the boss 5, and is associated with the transmission system, not shown, for acting directly or indirectly on the indicating pointer (not shown) of the tacking apparatus, of which it is a part.

With this arrangement, when the vehicle on which the tacking indicator is mounted departs from a straight course, the frame 3 is subjected to a mechanical couple and is thus deflected around the axis 4—4' under the control of the gyroscope. When the straight course is resumed, the gyroscope is restored to its vertical position by means of the rectifying and damping apparatus which will now be described.

This apparatus consists of two levers 6 and 7 hinged on the bearing 8. The supporting frame 14 for the tacking indicator apparatus, supports the shaft 8 and the stud 13. The stud 13, of the same dimensions as the boss 5, is designed to retain one of the levers 6 and 7 in normal position when the other is displaced by the movement of frame 3. Accordingly, as the frame 3 deflects in one direction or the other, one of the levers 6 or 7 as the case may be, is moved away from its normal position and is subsequently restored to normal by the spring 10, its turning movement being damped by the air-damper or dash-pot 9. As shown, the ends of the spring 10 and of the air-damper 9, are connected respectively with the levers 6 and 7. With such an arrangement the reactions of the system are equal as the frame 3 is deflected in either direction.

Figure 2:
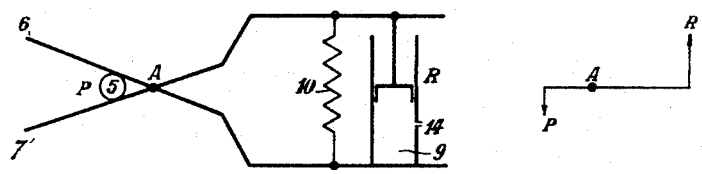
Figs. 2, 3 and 4 are schematic diagrams showing modifications of damping or restoring apparatus employing different types of levers.
Figure 3:
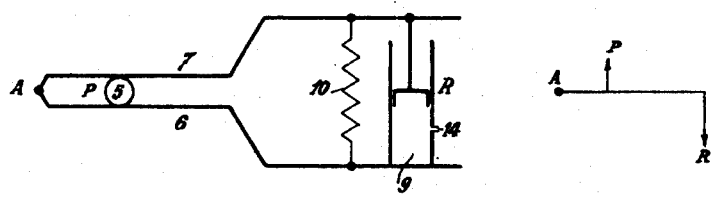
Figure 4:
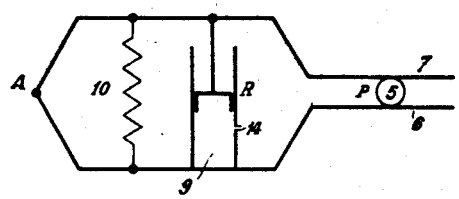

Figs. 2, 3 and 4 schematically represent different species of well known levers which could, if desired, be adapted to the restoring apparatus according to the features of the invention. The cylinder of the air damper is provided with an adjustable air vent 14 which may be designed in any suitable manner.

Figure 5:
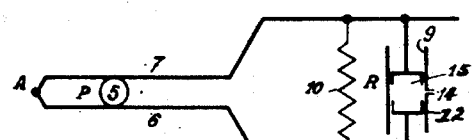
Fig. 5 is a schematic diagram of a modification of restoring apparatus employing a double air-damper.

As shown schematically in Fig. 5, one modification of the arrangement shown in Fig. 1, may utilize a double air-damper 9 including a fixed cylinder 12 and two pistons 11 and 15 actuated by the levers 6 and 7 respectively.

Still another modification consists, according to another feature of the invention, in apparatus in which the levers 6 and 7 have a profile of cam shape, or are otherwise cam actuated, so as to amplify the reaction of spring 10 at the start and finish of the deflection of frame 3.

It is clear that the invention is not limited by the examples of embodiments shown and described, but on the contrary is susceptible of numerous modifications and applications without departing from its principles.

What is claimed is:

1. Damping mechanism for a gyroscope, comprising a pair of pivotally mounted lever arms, yieldable means engaging said arms and tending to maintain the same in parallelism with each other, movable means adapted to move one of said arms angularly with respect to the other in consonance with a deflection of the gyroscope, a stop for preventing movement of either arm as the other arm is moved and damping means coupling one arm to the other to damp the movement of the moved arm.

2. Damping mechanism for a gyroscope, comprising a pair of lever arms, a common pivot upon which said arms are mounted, retractile means engaging said arms and tending to retain the same in parallelism to each other, means interposed between said arms and movable with the gyroscope to move either of said arms angularly in consonance with a deflection of the gyroscope, a stop interposed between said arms adapted to immobilize either arm as the other is moved and damping means coupling one arm to the other and attached to said arms to damp the movement of the moved arm.

3. Damping mechanism for a gyroscope, comprising a pair of pivotally mounted lever arms, a retractile spring engaging said arms and tending to retain the same in parallelism with each other, a member movable with the gyroscope and adapted to move either arm relatively to the other in consonance with a deflection of the gyroscope, a fixed stop adapted to immobilize either arm as the other is moved relatively thereto and a dash-pot arranged between said arms to damp the movement of the moved arm.

4. Damping mechanism for a gyroscope, comprising a pair of lever arms pivotally interconnected on a single pivot at their lower ends, a member interposed between intermediate parts of said arms and movable with the gyroscope to move either arm relatively to the other in consonance with a deflection of the gyroscope, a fixed stop interposed between intermediate parts of said arms and adapted to immobilize either arm as the other is moved, a retractile spring engaging said arms adjacent their upper ends and tending to draw said arms into parallelism with each other and a dash-pot interconnecting said arms near their upper ends.

GUY L. M. HÉRONDELLE.

REFERENCES CITED

The following references are of record in the file of this patent:

UNITED STATES PATENTS

| Number | Name | Date |
|---|---|---|
| 2,236,340 | Marggraf | Mar. 25, 1941 |
| 1,988,341 | Sjolander | Jan. 15, 1935 |
| 2,248,447 | Wood | July 8, 1941 |
| 1,069,070 | Magnuson | July 29, 1913 |

FOREIGN PATENTS

| Number | Country | Date |
|---|---|---|
| 87,153 | Sweden | June 18, 1936 |
| 37,799 | The Netherlands | Mar. 17, 1936 |

OTHER REFERENCES

"Ingenious Mechanisms," by Jones, page 379 of Vol. II, The Industrial Press, New York, 1936 (first edition). (Copy in Div. 12.)